(12) United States Patent
Chiarello

(10) Patent No.: US 12,503,186 B1
(45) Date of Patent: Dec. 23, 2025

(54) VEHICLE VISIBILITY AND SAFETY DEVICE AND METHOD

(71) Applicant: Joseph Chiarello, Peoria, AZ (US)

(72) Inventor: Joseph Chiarello, Peoria, AZ (US)

( * ) Notice: Subject to any disclaimer, the term of this patent is extended or adjusted under 35 U.S.C. 154(b) by 0 days.

(21) Appl. No.: 18/746,785

(22) Filed: Jun. 18, 2024

Related U.S. Application Data

(60) Provisional application No. 63/522,047, filed on Jun. 20, 2023.

(51) Int. Cl.
  *B62J 6/26* (2020.01)
(52) U.S. Cl.
  CPC ...................... *B62J 6/26* (2020.02)
(58) Field of Classification Search
  CPC ............... F21W 2103/10; B62J 6/26
  See application file for complete search history.

(56) References Cited

U.S. PATENT DOCUMENTS

| | | | |
|---|---|---|---|
| 7,387,402 B1 | 6/2008 | Lui (Phillip) | |
| 8,134,300 B2 | 3/2012 | Maglica et al. | |
| 8,911,103 B2 | 12/2014 | Matthews et al. | |
| 9,067,535 B2 * | 6/2015 | Freiser | B60Q 1/2657 |
| 2008/0180962 A1 | 7/2008 | Edmond et al. | |
| 2011/0075403 A1 * | 3/2011 | Niezrecki | B62J 6/015 |
| | | | 362/183 |

FOREIGN PATENT DOCUMENTS

| | | |
|---|---|---|
| BR | 102015019029 A2 | 3/2016 |
| JP | 2010165634 A | 7/2010 |
| JP | 5531153 B2 | 6/2014 |
| JP | 3202421 U | 2/2016 |
| JP | 2021518628 A | 8/2021 |

* cited by examiner

*Primary Examiner* — Mariceli Santiago

(57) ABSTRACT

A vehicle visibility and safety device may include a mount base attachable to a vehicle, and a light support carried by the mount base. The light support may be length-adjustable along a selected direction. At least one light source may be positioned at the light support, and may illuminate to form at least one light pattern, which may be elongately formed along the selected direction and may extend from the vehicle along the selected direction. The length of the elongated light pattern may be adjusted by extending or retracting the light source. An electrically-operated actuating mechanism may be operated to simultaneously extend the light source and the light support along the selected direction, or alternatively simultaneously retract the light source and the light support along the selected direction. A remote control device may facilitate user operation of the at least one light source and the electrically-operated actuating mechanism.

17 Claims, 15 Drawing Sheets

VEHICLE VISIBILITY AND SAFETY DEVICE AND METHOD

CROSS-REFERENCE TO RELATED APPLICATION

This application claims the benefit of U.S. Provisional Patent Application No. 63/522,047, filed on Jun. 20, 2023, which is incorporated herein by reference in its entirety.

FIELD OF THE INVENTION

The present invention relates generally to vehicles, and more particularly, to a vehicle visibility and safety device and method, wherein the device can be attached to a motorcycle or other vehicle to enhance visibility of the vehicle for safety purposes.

BACKGROUND OF THE INVENTION

In the world of automobiles, operators of motor vehicles are encouraged to drive defensively by looking out for other cars and trucks on the road. Oftentimes, however, motorcycles are not on the radar of car and truck drivers. Motorcycles are at a disadvantage on the road due to their smaller size and ability to accelerate and decelerate far faster than other vehicles. This disadvantage is exacerbated for dark-colored motorcycles, as brightly colored motorcycles are much more likely to be noticed by drivers of other vehicles.

Each year, there are thousands of deaths and injuries to motorcyclists involved in crashes. More than 5,500 motorcyclists died on the nation's roads in 2020. Over 180,000 motorcyclists were treated in emergency departments for crash injuries. The economic costs of these injuries and deaths are significant.

Motorcycle crash injuries and deaths are preventable. A universal helmet law is the single most effective way for states to save lives and cost savings related to motorcycle crash injuries. Helmets were found to have saved an estimated 1,872 lives in 2017. If all motorcyclists had worn helmets in 2017, as many as 749 more lives could have been saved. Each year, the United States could save $1.5 billion in economic costs if all motorcyclists wore helmets. Motorcycle helmets are 37 percent (for riders) and 41 percent (for passengers) effective in preventing deaths. Helmets reduce the risk of head injury by 69%.

While helmets go a long way toward saving lives and preventing long-term injury, enhancing the visibility of a motorcycle or other vehicle can prevent or substantially reduce the likelihood of a crash occurring.

Accordingly, there is need for solutions which allow to enhance visibility of motorcycles or other vehicles for safety purposes.

SUMMARY OF THE INVENTION

The present invention is directed to a vehicle visibility and safety device and method, wherein the device can be attached to a motorcycle or other vehicle to enhance visibility of the vehicle for safety purposes. The vehicle visibility and safety device may include a mount base attachable to a vehicle, and a light support carried by the mount base. The light support may be length-adjustable along a selected direction. At least one light source may be positioned at the light support, and may illuminate to form at least one light pattern, which may be elongately formed along the selected direction and may extend from the vehicle along the selected direction. The length of the elongated light pattern may be adjusted by extending or retracting the light source. An electrically-operated actuating mechanism may be operated to simultaneously extend the light source and the light support along the selected direction, or alternatively simultaneously retract the light source and the light support along the selected direction. A remote control device may facilitate user operation of the at least one light source and the electrically-operated actuating mechanism.

In a first implementation of the invention, a vehicle visibility and safety device may include a mount base configured for attachment to the vehicle, and a light support carried by the mount base. The vehicle visibility and safety device may further include at least one light source positioned at the light support. The at least one light source may be configured to illuminate and thereby form at least one light pattern. The at least one light pattern may be elongately formed along a selected direction and may extend from the vehicle along the selected direction. The vehicle visibility and safety device may further include a remote control device configured to facilitate user operation of the at least one light source.

In a second aspect, the at least one light source may be selectively extendable from and retractable towards the mount base to vary a length of the at least one elongated light pattern along the selected direction.

In another aspect, the at least one light source may include an LED strip.

In another aspect, the at least one light source may be contained within the light support.

In another aspect, at least part of the light support may be translucent. The at least one light source may extend along the translucent part of the light support.

In yet another aspect, the light support may be extendable from and retractable towards the mount base jointly with the at least one light source.

In another aspect, the light support may be length-adjustable along the selected direction.

In another aspect, the light support may include a telescopically extendable and retractable tube formed by a plurality of tubular sections arranged in telescoping relationship with one another along the selected direction.

In another aspect, a proximal tubular section of the plurality of tubular sections may be attached to and extend from the mount base.

In yet another aspect, the vehicle visibility and safety device may further include an electrically-operated actuating mechanism configured to selectively extend and retract the at least one light source from and towards the mount base, respectively.

In another aspect, the mount base may include a housing defining an interior space. The electrically-operated actuating mechanism may be housed within the interior space.

In another aspect, the electrically-operated actuating mechanism may be configured to selectively increase or reduce a length of the light support along the selected direction simultaneously to extending or retracting the at least one light source from and towards the mount base, respectively.

In another aspect, the electrically-operated actuating mechanism may include an electric motor, a pinion driven for rotation by the electric motor, and a flexible gear rack selectively extendable and retractable by the pinion in the selected direction responsively to rotation of the pinion. The at least one light source may be extendable from and retractable towards the mount base by a force exerted thereon by the flexible gear rack when the flexible gear rack extends and retracts, respectively.

In yet another aspect, the force may be exerted by a distal end of the flexible gear rack opposite to the pinion.

In another aspect, the at least one light source may be affixed to the flexible gear rack and extend along the flexible gear rack.

In another aspect, the remote control device may be configured to wirelessly control operation of the at least one light source.

In another aspect, the remote control device may include a user interface enabling remote operation of the at least one light source by a user.

In yet another aspect, the user interface may be provided on a tactile screen of the remote control device.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward a vehicle visibility and safety device and method, wherein the device can be attached to a motorcycle or other vehicle to enhance visibility of the vehicle for safety purposes.

Figure 1A:
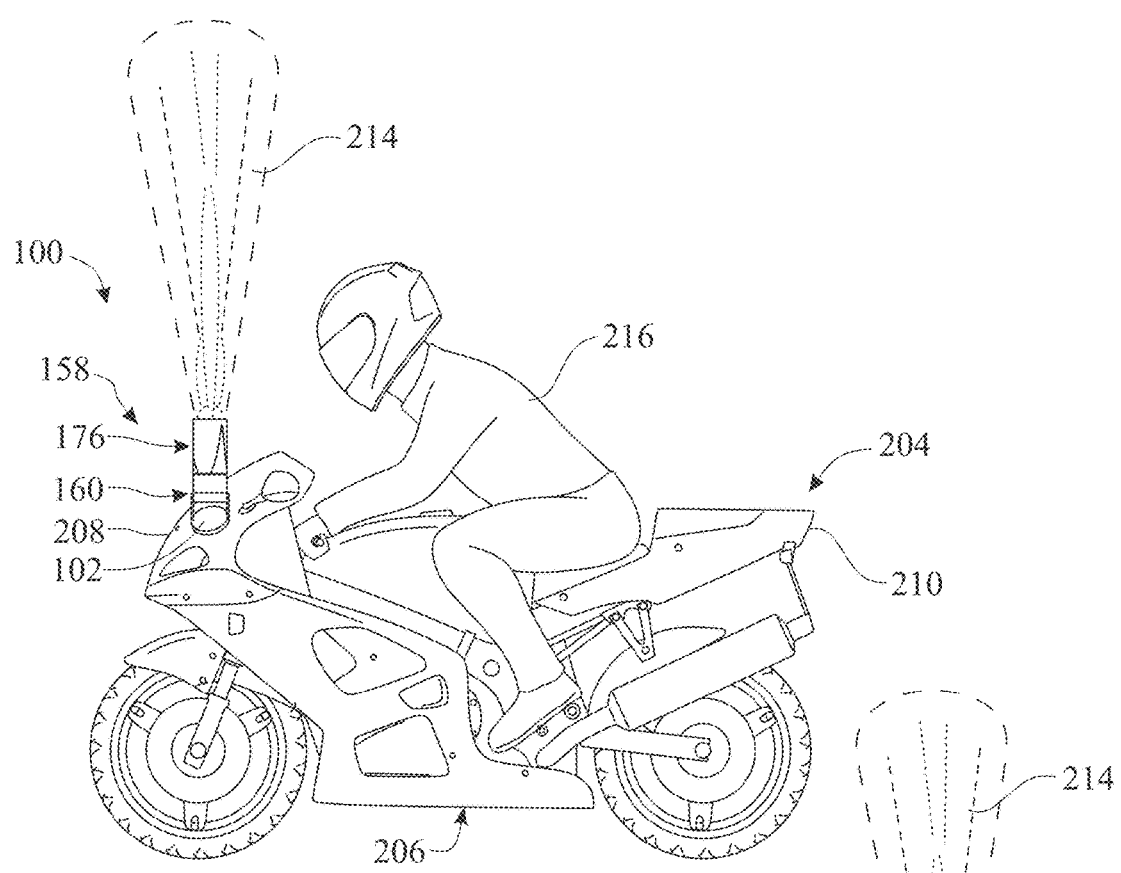
FIG. 1A presents a side view of a vehicle visibility and safety device in accordance with an illustrative embodiment of the present invention, mounted on the front vehicle end of a vehicle with a light pattern emitted from the device in typical application of the device.
Figure 1B:
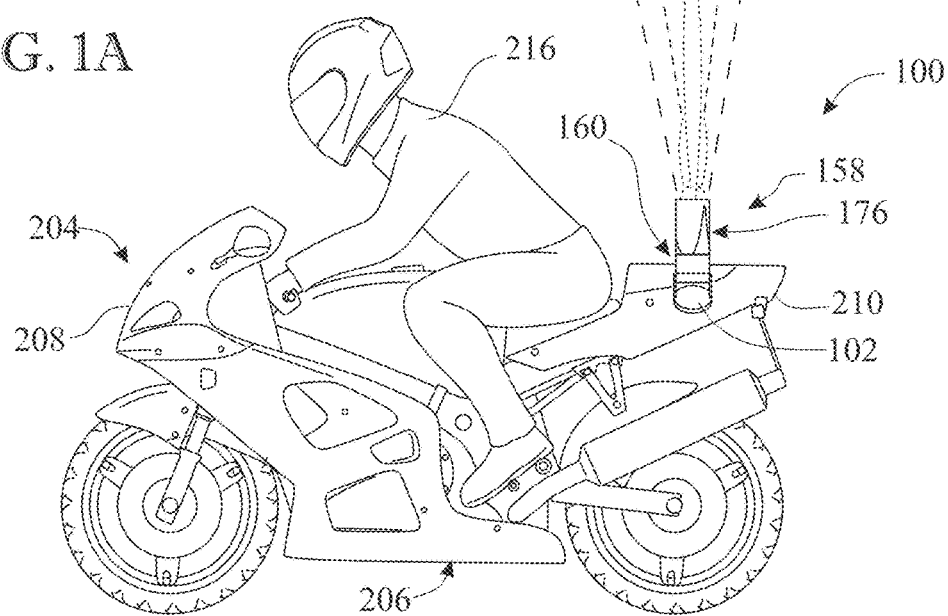
FIG. 1B presents a side view of the vehicle visibility and safety device mounted on the rear vehicle end of the vehicle.
Figure 5:
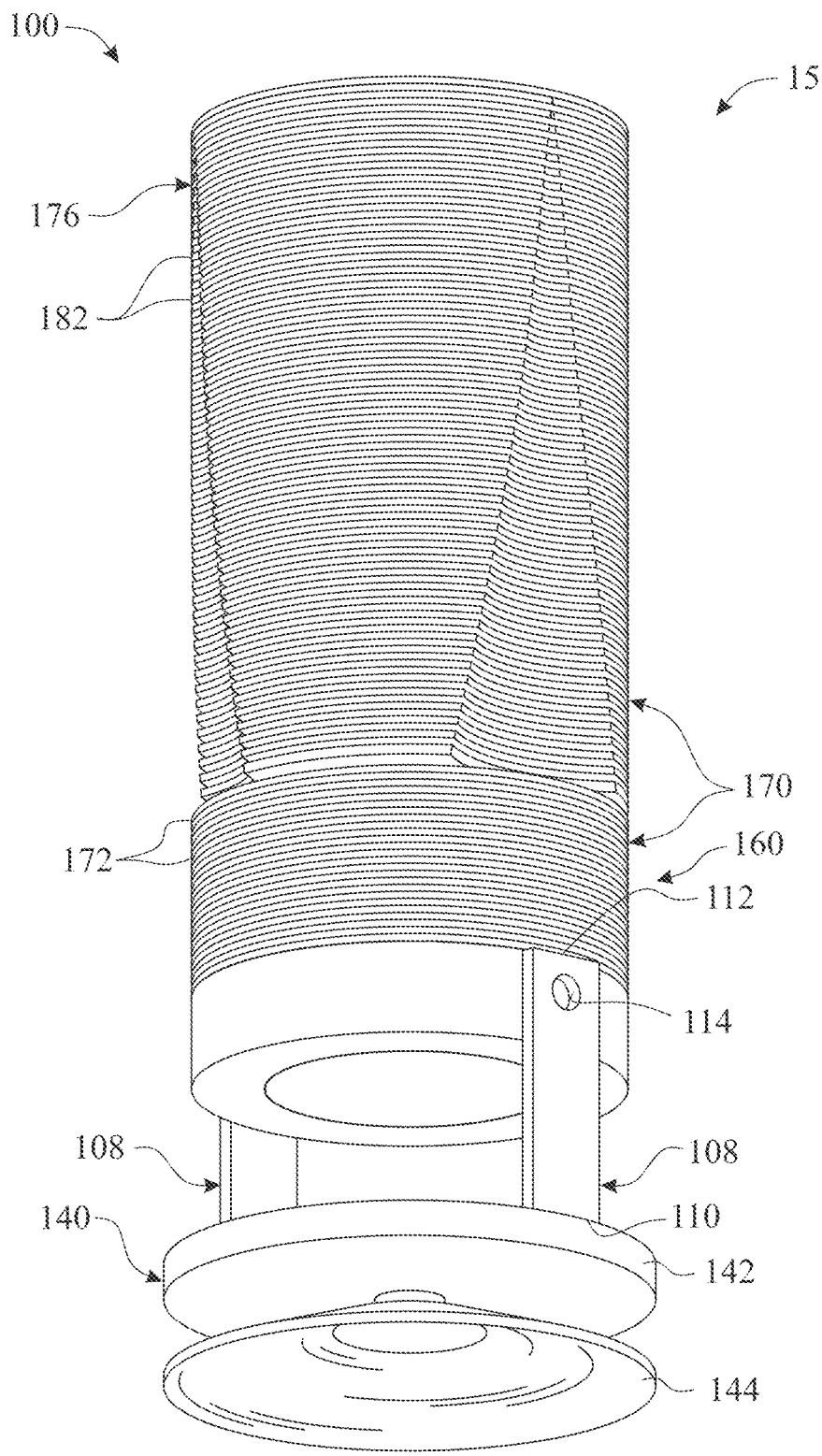
FIG. 5 presents a bottom perspective view of the illustrative vehicle visibility and safety device, more particularly illustrating a mount base having a suction cup mount configured to mount the device on a vehicle.
Figure 6:
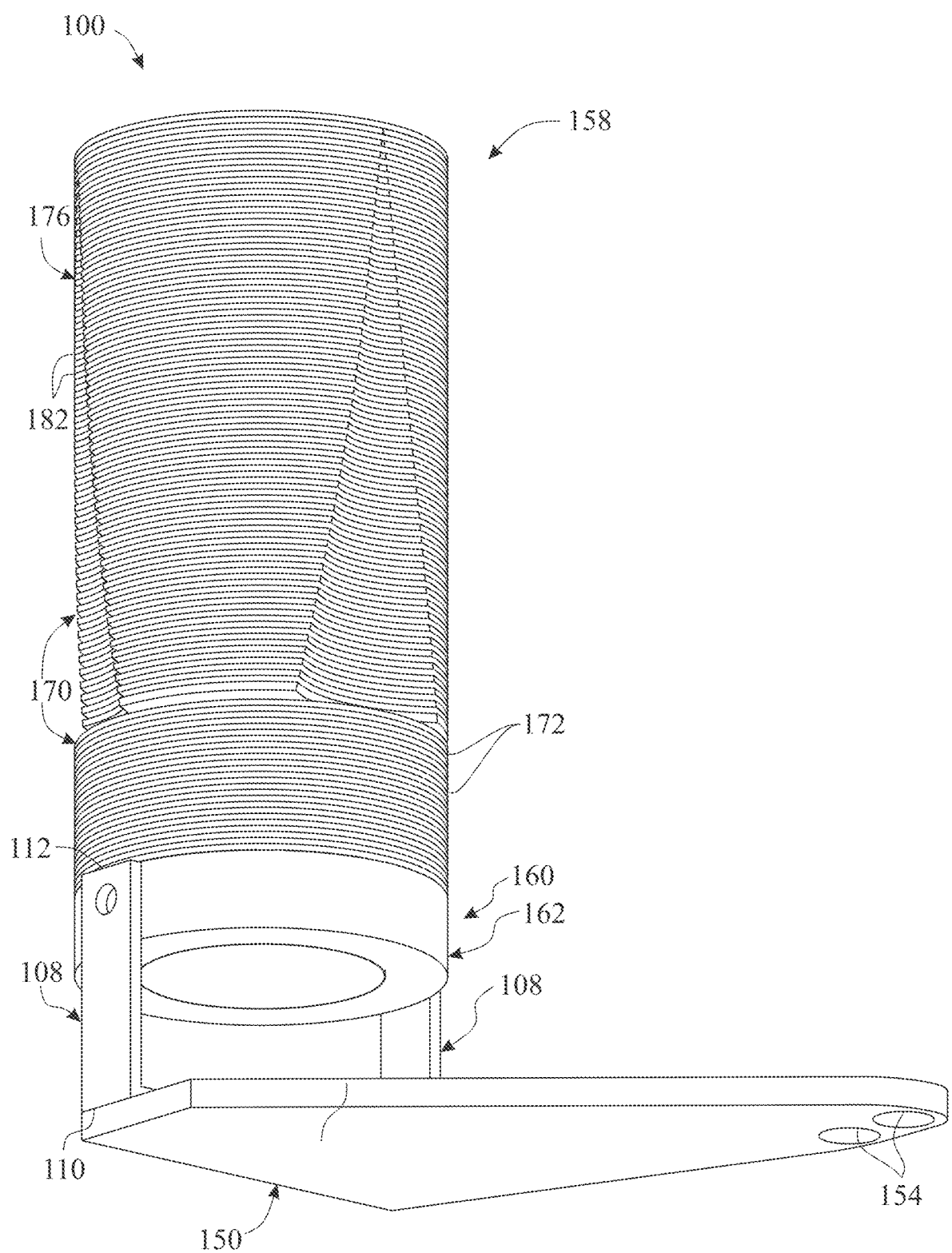
FIG. 6 presents a bottom perspective view of the illustrative vehicle visibility and safety device, more particularly illustrating a mount base having a mount foot configured to mount the device on a vehicle.
Figure 7:
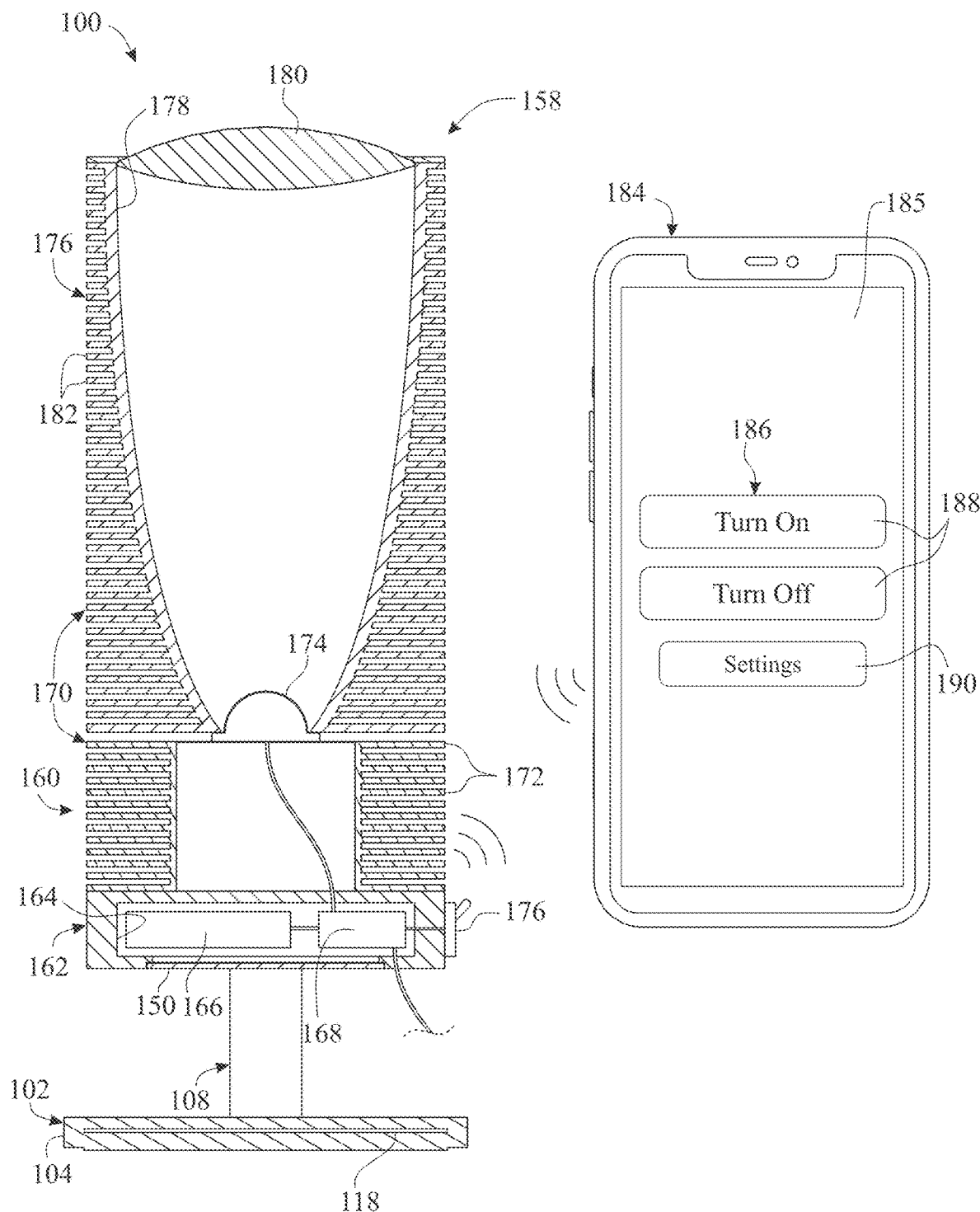
FIG. 7 presents a longitudinal sectional view of the mount base, light housing and light reflector of the illustrative vehicle visibility and safety device and a remote control device wirelessly interfacing with the device for control of the device in typical application thereof.

Referring initially to FIGS. 1-8, a vehicle visibility and safety device, hereinafter safety device 100, is illustrated in accordance with an illustrative embodiment of the present invention. As shown for instance in FIG. 2, the safety device 100 may include mount base 102. The mount base 102 may be configured for attachment to a motorcycle or other vehicle 204 (FIG. 1). A light support 158 may be provided on the mount base 102. The light support 158 may include at least one light source 174 (FIG. 7). As illustrated in FIGS. 1A and 1B, the light source 174 may be configured to emit at least one light pattern 214 in a selected orientation or direction from the light support 158. Accordingly, as illustrated in FIGS. 1A and 1B and will be hereinafter described, in an exemplary application, the mount base 102 may be mounted to the vehicle 204. The light source 174 may be operated to emit the light pattern 214 from the light support 158 in the selected direction or orientation. The light pattern 214 may be emitted horizontally, vertically, and/or in another direction to enhance visibility of the vehicle 204 to other drivers.

In some embodiments, the light source 158 may include at least one light housing 160 on the mount base 102. As illustrated in FIG. 7, the light housing 160 may contain at least one light source 174. A light reflector 178 may communicate with the light source 174 in the light housing 160. A lens 180 may be provided on the light reflector 178. Accordingly, as illustrated in FIGS. 1A and 1B, in an exemplary application, the mount base 160 may be mounted to the vehicle 204. The light source 174 may be operated to emit a light pattern 214 through the light reflector 178 and from the lens 180. The light pattern 214 may be emitted horizontally, vertically, and/or in another direction to enhance visibility of the vehicle 204 to other drivers.

In some embodiments, the light support 158 may include at least one heat sink 170. The heat sink 170 may be configured to absorb heat emitted by the light source 174. In some embodiments, the heat sink 170 may include heat sink panels 182 provided on the light reflector 178. The heat sink 170 may include a plurality of heat sink panels 172. The heat sink panels 172 may be made of a thermally conductive material. For example and without limitation, in some embodiments, the thermally conductive material of the heat sink panels 172 may include copper. As illustrated in FIG. 7, in some embodiments, the heat sink panels 172 may extend outwardly from the light reflector 178.

Figure 2:
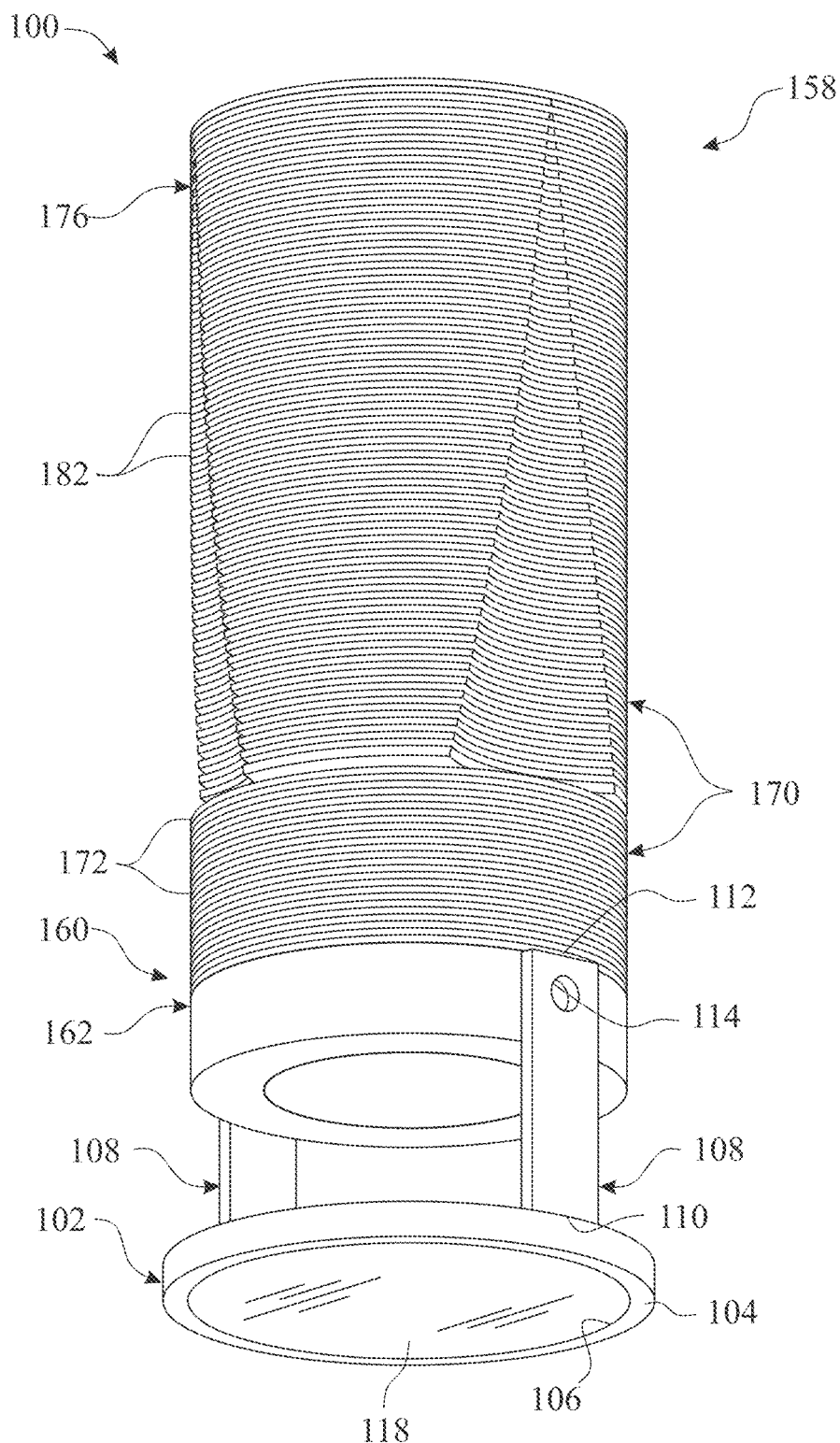
FIG. 2 presents a bottom perspective view of the illustrative vehicle visibility and safety device, more particularly illustrating a mount base having a mount magnet configured to mount the device on a vehicle.
Figure 3:
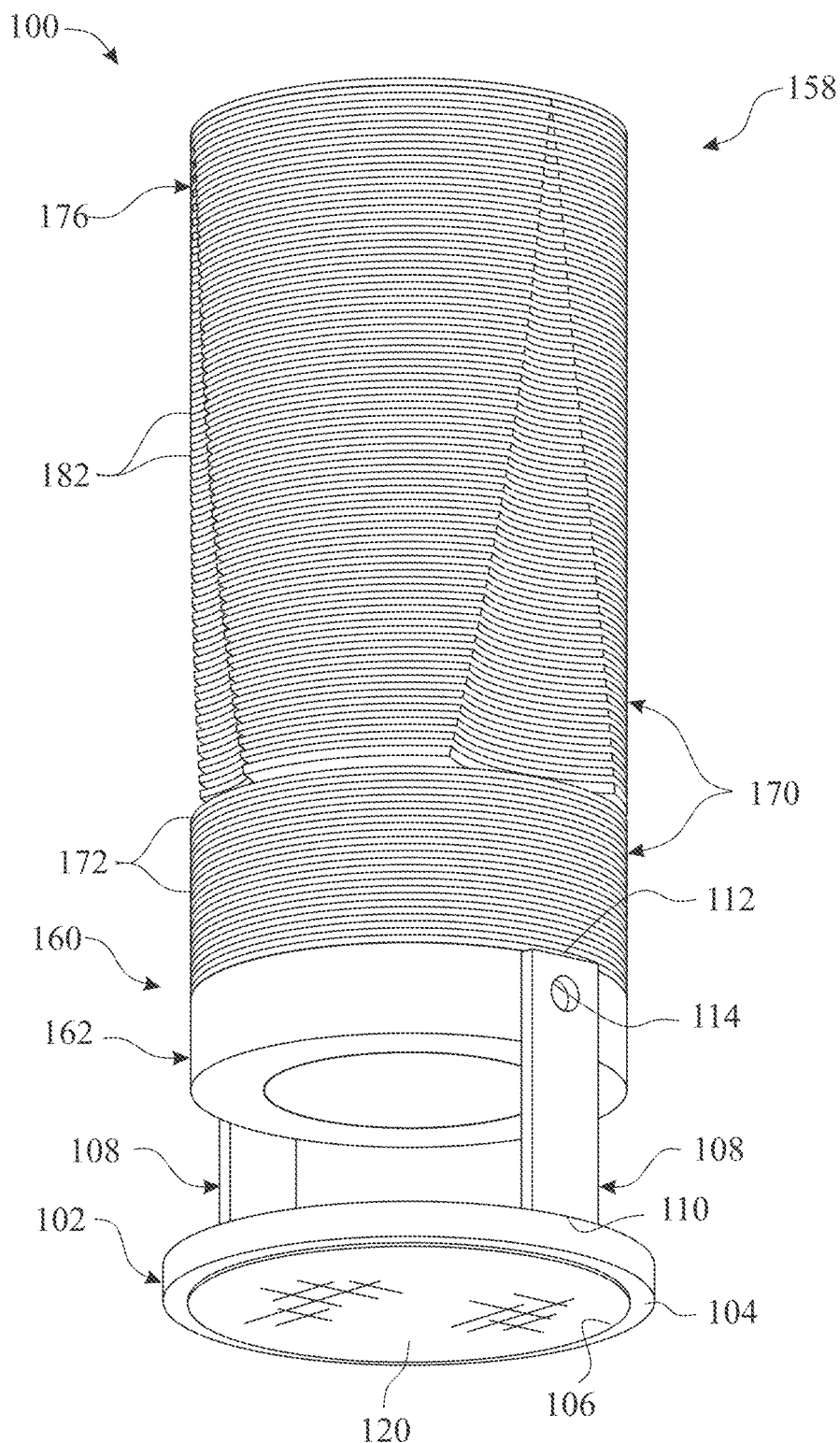
FIG. 3 presents a bottom perspective view of the illustrative vehicle visibility and safety device, more particularly illustrating a mount base having an adhesive mount material configured to mount the device on a vehicle.

As illustrated in FIGS. 2 and 3, in some embodiments, the mount base 102 may include a frame 104. The mount base 102 may further include at least one arm 108 extending from the frame 104. The arm 108 may be configured for attachment to the light housing 160. For example and without limitation, in some embodiments, each arm 108 of the mount base 102 may have a frame end 110 at the frame 104 and an attachment end 112 at the light housing 160. At least one fastener opening 114 may extend through the arm 108 at the attachment end 112. A fastener (not illustrated) may be extended through the fastener opening 114 for attachment of the arm 108 to the light housing 160.

With reference to FIG. 2, in some embodiments, the frame 104 of the mount base 102 may have a frame opening 106. A mount magnet 118 may be provided in the frame opening 106. The mount magnet 118 may facilitate magnetic attachment of the mount base 102 to the vehicle 204.

Alternatively, as illustrated in FIG. 3, in some embodiments, the frame 104 of the mount base 102 have a solid disc construction, and an adhesive mount material 120 may be provided on the frame 104. In a variation of such embodiments, the adhesive mount material 120 may be mounted over the mount magnet 118 at opening 106. The adhesive mount material 120 may facilitate attachment of the mount base 102 to the vehicle 204.

Figure 4:
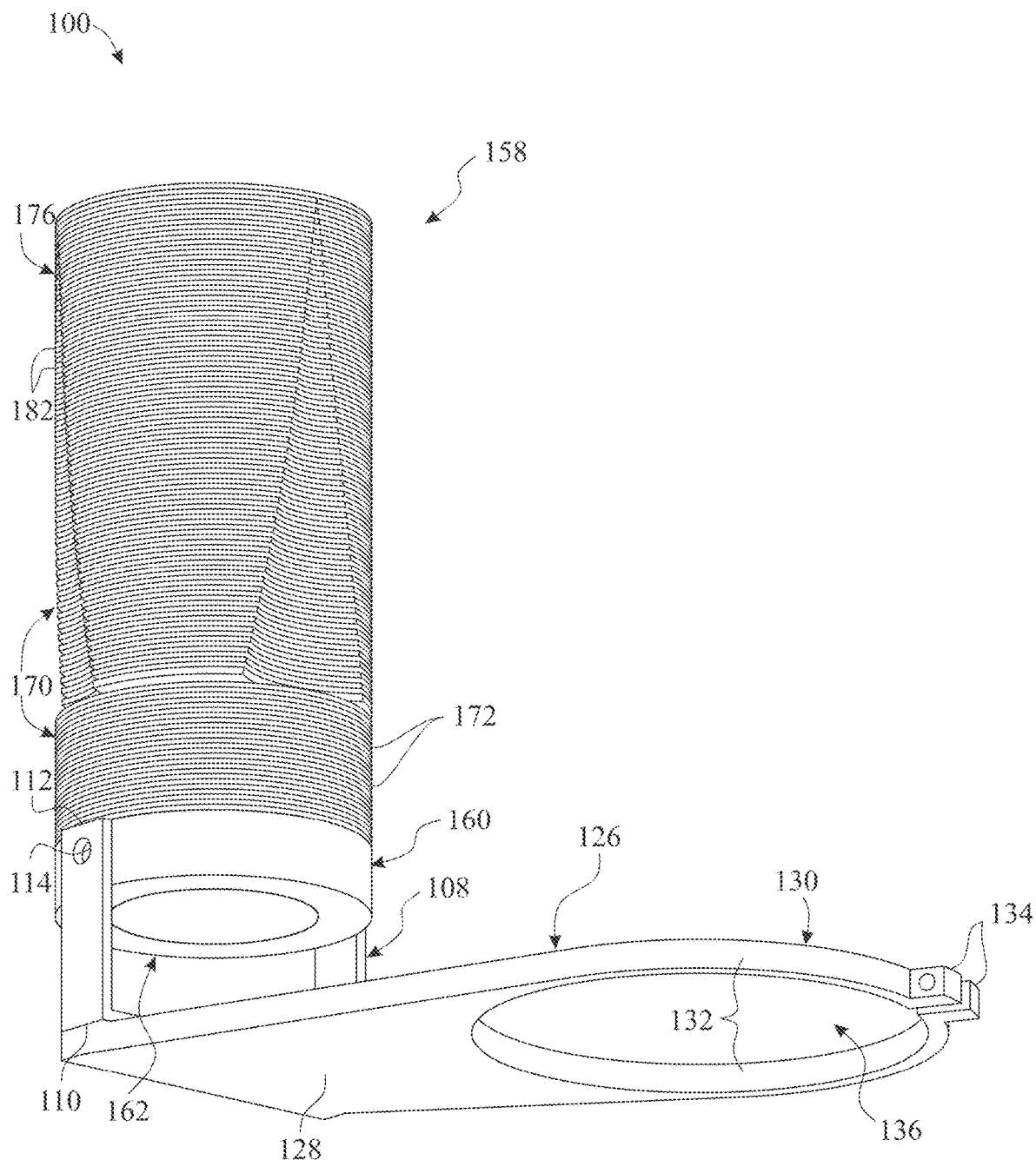
FIG. 4 presents a bottom perspective view of the illustrative vehicle visibility and safety device, more particularly illustrating a mount base having a clamp configured to mount the device on a vehicle.

As illustrated in FIG. 4, in some embodiments, the mount base 126 may include a main arm 128. The arms 108 which attach the mount base 126 to the light housing 160 may extend from the main arm 128. A clamp 130 may be provided on the main arm 128. The clamp 130 may facilitate attachment of the mount base 126 to a structural component on the vehicle 204. In some embodiments, the clamp 130 may include a pair of clamp arms 132 which extend from the main arm 128. A clamp opening 136 may be formed by and between the clamp arms 132. The clamp opening 136 may be sized and configured to receive the structural component on the vehicle 204. A pair of clamp arm flanges 134 may terminate the respective clamp arms 132 to facilitate securement of the clamp arms 132 to each other in attachment of the mount base 126 to the vehicle 204.

As illustrated in FIG. 5, in some embodiments, the mount base 140 may include a frame 142 having a solid disc construction. A suction cup mount 144 may be provided on the frame 142. The suction cup mount 144 may facilitate detachable attachment of the mount base 140 to a flat surface on the vehicle 204.

As illustrated in FIG. 6, in some embodiments, the mount base 150 may include an elongated mount foot 152. At least one mount foot opening 154 may be provided in the mount foot 152. The mount foot opening 154 may be sized and configured to receive a fastener (not illustrated) for attachment of the mount base 150 to the vehicle 204. In some embodiments, the mount foot 152 of the mount base 150 may be triangular.

As illustrated in FIG. 7, the light housing 160 may include a light housing base 162. The light housing base 162 may have a housing interior 164. At least one battery 166 and/or a microcontroller 168 may be provided in the housing interior 164. The battery 166 and/or the microcontroller 168 may interface with the light source 174 for selective operation of the light source 174 typically as will be hereinafter described. In some embodiments, the microcontroller 168 may be configured to facilitate remote or wireless control of the light source 174, typically as will be hereinafter described.

The light source 174 may include at least one light source which is capable of emitting the light pattern 214 from the device 100. For example and without limitation, in some embodiments, the light source 174 may include at least one light-emitting diode (LED). The light source 174 may include a plurality of LEDs which may emit light of the same or different colors. Additionally or alternatively, the light source 174 may include at least one laser emitter, at least one incandescent light source and/or at least one fluorescent light source. In some embodiments, the light source 174 may be configured to emit the light pattern 214 from the light housing 160 approximately 5-10 feet vertically, horizontally, diagonally or in any other direction or orientation.

As illustrated in FIG. 7, in some embodiments, the light source 174 may be configured for remote operation using an electronic remote control device 184. The remote control device 184 may be configured for wireless operation of the light source 174 via the microcontroller 168. The remote control device 184 may include a smartphone, tablet computer, personal digital assistant (PDA) or the like. The software which is loaded on the remote control device 184 may be an app configured to display a user interface 186 on a tactile screen 185 of the remote control device 184, as shown, for operation of the light source 174. The user interface 186 may have one or more user-operable controls (e.g., virtual buttons). For example, the one or more user-operable controls may include at least one power selector 188. The power selector 188 may facilitate selective energizing and operating of the light source 174 to emit the light pattern 214.

Figure 8:
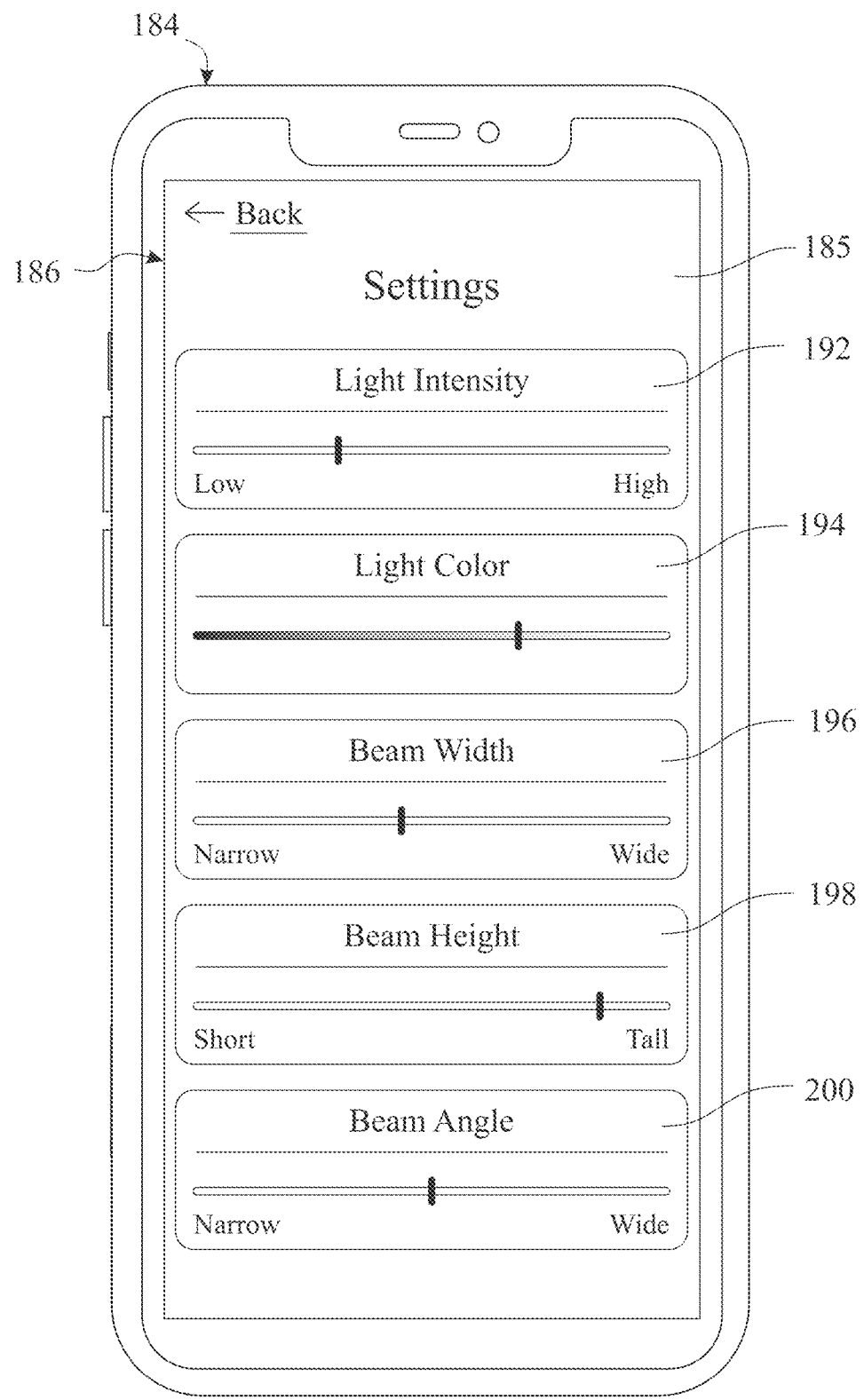
FIG. 8 presents a typical screen shot of the electronic device with a user interface having various controls for the device displayed on the device.

As further illustrated in FIG. 7, in some embodiments, the one or more user-operable controls of the user interface 186 may include a settings selector 190. As illustrated in FIG. 8, operation of the settings selector 190 may lead to a second screen including additional user-operable controls such as one or more of the following: a light intensity control 192, a light color control 194, a beam width control 196, a beam height control 198, and a beam angle control 200. The light intensity control 192 may facilitate user adjustment or control of the light intensity of the light pattern 214 emitted from the light source 174. The light color control 194 may facilitate control of the color or colors of the light pattern 214. The beam width control 196 may facilitate control of the width of the light pattern 214. The beam height control 198 may facilitate control of the height of the light pattern 214. The beam angle control 200 may facilitate control of the angle at which the light pattern 214 is emitted from the device 100.

As illustrated in FIGS. 1A and 1B, in typical application, the device 100 may be mounted on the vehicle 204 to enhance visibility of the vehicle 204 for safety purposes. In some applications, the vehicle 204 may be a motorcycle. In other applications, the vehicle 204 may be a bicycle, a scooter, an automobile, or any other motorized or non-motorized vehicle. The vehicle 204 may include a vehicle frame 206 having a front vehicle end 208 and a rear vehicle end 210. The mount base 102 may be used to securely mount the device 100 on the front vehicle end 208, the rear vehicle end 210, or other suitable location on the vehicle 204. For example and without limitation, the mount base 102 of the device 100 illustrated in FIG. 2 may magnetically attach the device 100 to the vehicle 204. The mount base 102 of the device 100 illustrated in FIG. 3 may adhesively attach the device 100 to the vehicle 204. The mount base 126 of the device 100 illustrated in FIG. 4 may clamp the device 100 to the vehicle 204. The mount base 140 of the device 100 in FIG. 5 may mount the device 100 to the vehicle 204 via the suction cup mount 144. The mount base 150 of the device 100 illustrated in FIG. 6 may mount the device 100 to the vehicle 204 via the mount foot 152.

In some applications, the microcontroller 168 or the light source 174 may be hardwired into the vehicle 204 such that the light source 174 is energized when the vehicle 204 is on. In other applications, the microcontroller 168 or the light source 174 may be controlled by a manual switch 176 (FIG. 7) which may be provided on the light housing base 162 or elsewhere on the safety device 100.

In some applications, a vehicle operator 216 of the vehicle 204 may operate the light source 174 (FIG. 7) of the device 100 wirelessly using the remote control device 184. For example, the vehicle operator 216 may open the app on the remote control device 184 to present the user interface 186 on the display of the device 184. The vehicle operator 216 may touch the appropriate power selector(s) 188 on the user interface 186 to facilitate emission of the light pattern 214 from the light source 174 through the light reflector 178 and the lens 180, respectively. Accordingly, as illustrated in FIGS. 1A and 1B, in some applications, the light pattern 214 may be emitted in a column above the device 100. Various characteristics such as the light intensity, light color, beam width, beam height and beam angle of the light pattern 214 may be selected by manipulation of the respective light intensity control 192, light color control 194, beam width control 196, beam height control 198 and beam angle control 200 on the user interface 186, as was heretofore described with respect to FIG. 8.

As the vehicle operator 216 operates the vehicle 204 on a road or street, particularly in a dark or semi-dark environment, the light pattern 214 attracts the attention of the drivers of other vehicles on the road or street. Accordingly, the light pattern 214 renders the vehicle 204 more visible than would otherwise be the case, thus significantly enhancing the safety of the vehicle operator 216.

Figure 9A:
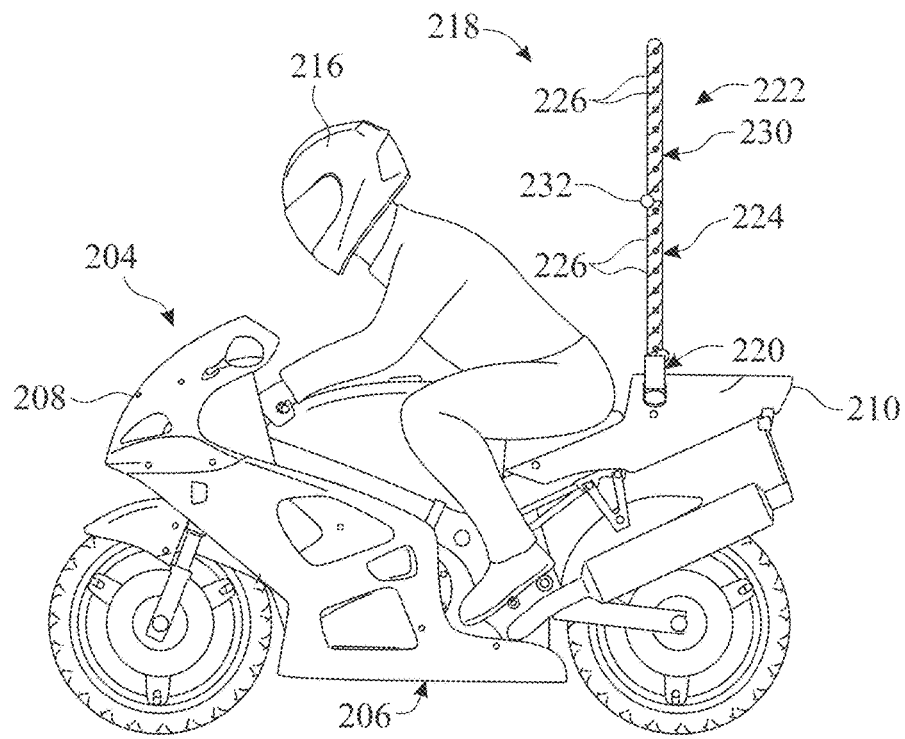
FIG. 9A presents a side view of a motorcycle with an illustrative foldable whip light embodiment of the vehicle visibility and safety device mounted on the motorcycle, more particularly illustrating an extended, functional position of the device.
Figure 9B:
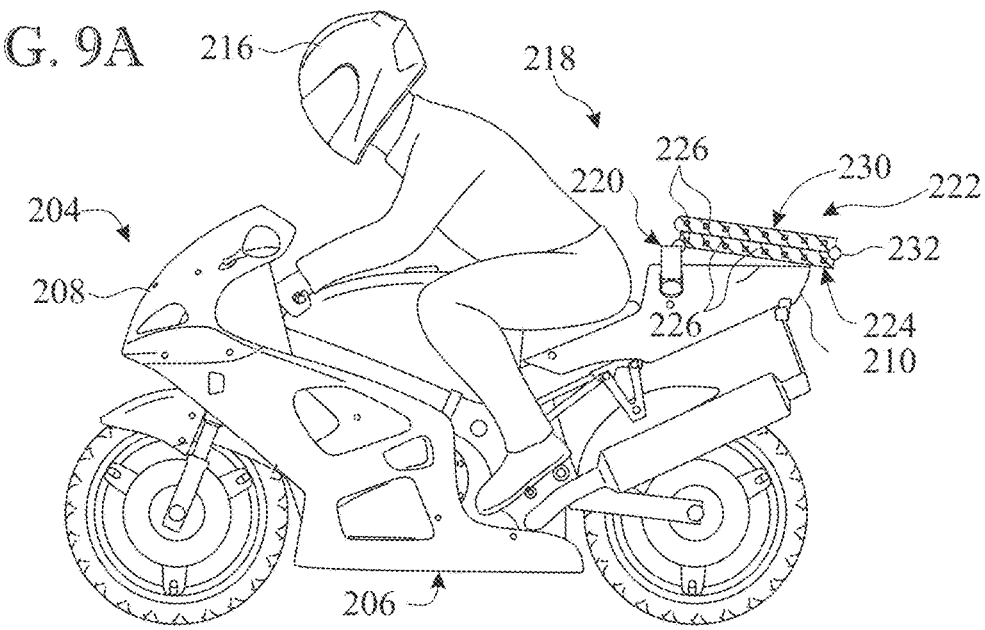
FIG. 9B presents a side view of the motorcycle with foldable whip light embodiment of the vehicle visibility and safety device illustrated in FIG. 9A, with the device deployed in a folded, storage position.

Referring next to FIGS. 9A and 9B of the drawings, in some embodiments, a foldable whip light embodiment of the safety device 218 may include a mount base 220. In various embodiments, the mount base 220 may have the same design as the mount base 102 heretofore described with respect to FIG. 2, the mount base 102 heretofore described with respect to FIG. 3, the mount base 126 heretofore described with respect to FIG. 4, the mount base 140 heretofore described with respect to FIG. 5, or the mount base 150 heretofore described with respect to FIG. 6.

A foldable light support 222 may be pivotally attached to the mount base 220. The foldable light support 222 may include a light panel 224 pivotally attached to the mount base 220. A folding light panel 230 may be pivotally attached to the light panel 224. A panel hinge 232 may pivotally attach the folding light panel 230 to the light panel 224 of the foldable light support 222. The folding light panel 230 and the light panel 224 of the foldable light support 222 may be selectively configurable in an extended, functional position (FIG. 9A) or a folded, storage position (FIG. 9B).

At least one, and typically, a plurality of light sources 226 may be provided in at least one of the light panel 224 and the folding light panel 230. Each light source 226 may be configured to emit at least one light pattern such as the light pattern 214 emitted by the light source 174 (FIG. 7) of the safety device 100 in FIGS. 1A and 1B.

Application of the safety device 218 may be as was heretofore described with respect to the safety device 100 in FIGS. 1A and 1B. In the extended, functional position of the light support 222, illustrated in FIG. 9A, the light sources 226 may be energized to emit light patterns from the light panel 224 and the folding light panel 230. The light patterns may render the vehicle 204 more visible and enhance the safety of the vehicle operator 216. When not in use, the foldable light support 222 may be deployed in the folded, storage position illustrated in FIG. 9B.

Figure 10A:
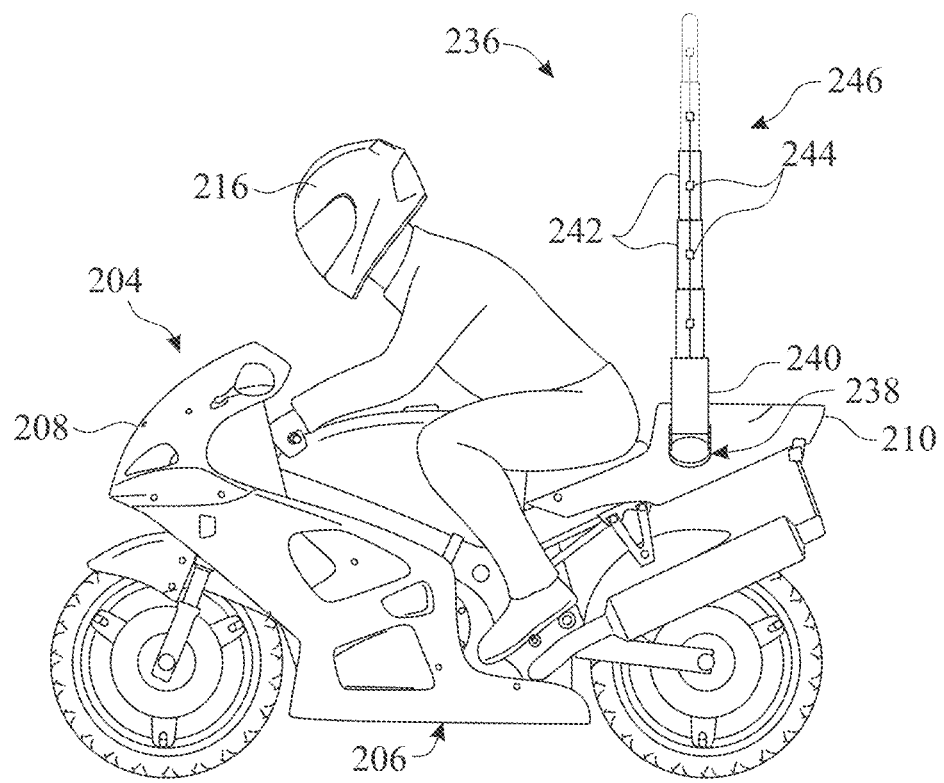
FIG. 10A presents a side view of a motorcycle with an illustrative collapsible whip light embodiment of the vehicle visibility and safety device mounted on the motorcycle, more particularly illustrating an extended, functional position of the device.
Figure 10B:
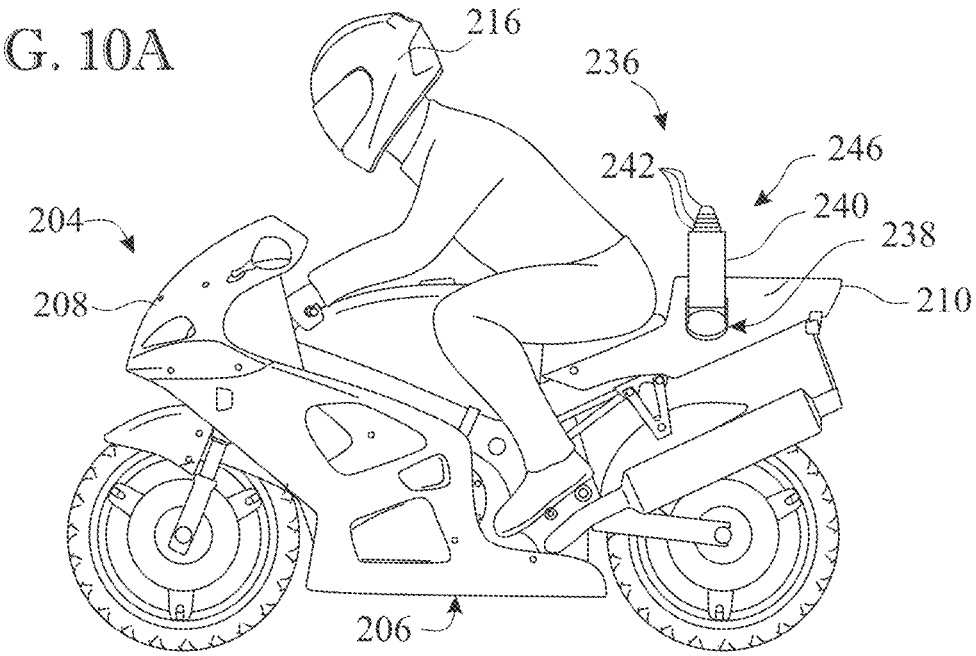
FIG. 10B presents a side view of the motorcycle with foldable whip light embodiment of the vehicle visibility and safety device illustrated in FIG. 9A, with the device deployed in a folded, storage position.

Referring next to FIGS. 10A and 10B of the drawings, in some embodiments, a collapsible embodiment of the safety device may include a mount base 238. In various embodiments, the mount base 238 may have the same design as the mount base 102 heretofore described with respect to FIG. 2, the mount base 102 heretofore described with respect to FIG. 3, the mount base 126 heretofore described with respect to FIG. 4, the mount base 140 heretofore described with respect to FIG. 5, or the mount base 150 heretofore described with respect to FIG. 6.

A collapsible light support 246 may be supported by the mount base 238. The collapsible light support 246 may include a tubular section or light section 240 which extends from the mount base 238. A plurality of extendable, tubular sections or light sections 242 may be telescopically extendable and collapsible with respect to each other and with respect to the light section 240. The extendable light sections 242 of the collapsible light support 246 may be selectively configurable in an extended, functional position (FIG. 10A) or a collapsed, storage position (FIG. 10B).

As illustrated in FIG. 10A, at least one light source 244 may be provided on each extendable light section 242 of the collapsible light support 246. Each light source 244 may be configured to emit at least one light pattern such as the light pattern 214 emitted by the light source 174 (FIG. 7) of the safety device 100 in FIGS. 1A and 1B.

Application of the collapsible safety device 236 may be as was heretofore described with respect to the safety device 100 in FIGS. 1A and 1B. In the extended, functional position of the collapsible light support 246 illustrated in FIG. 10A, the light sources 244 may be energized to emit light patterns from each extendable light section 242. The light patterns may render the vehicle 204 more visible and enhance the safety of the vehicle operator 216. When the safety device 236 is not in use, the collapsible light support 246 may be deployed in the folded, storage position illustrated in FIG. 9B.

The illustrations of FIGS. 11-15 show a vehicle visibility and safety device, hereinafter safety device 300, in accordance with another embodiment of the present invention. Similarly to previous embodiments, the safety device 300 is configured to be carried by a motorcycle, bicycle, scooter, automobile, or any other motorized or non-motorized vehicle, such as vehicle 204 shown in FIGS. 1A, 1B, and 9A-10B. Similarly to previous embodiments, and referring initially to FIG. 11, the safety device 300 includes a mount base 310 configured for attachment to the vehicle, a light support 340 carried by the mount base 310, and at least one light source 360 carried by the light support 340. Also similarly to previous embodiments, the at least one light source 360 is configured to illuminate and thereby form at least one light pattern, wherein the at least one light pattern is elongately formed along a selected direction with respect to the vehicle, as will be described in greater detail hereinafter. In some embodiments, the at least one light source 360 may consist of, or otherwise include, an LED strip 362, as shown.

As in previous embodiments, the safety device 300 may further include a remote control device configured to facilitate user operation of the at least one light source 360. In some embodiments, the remote control device may be configured to wirelessly control operation of the at least one light source 360. Alternatively or additionally, the remote control device may include a user interface enabling remote operation of the at least one light source 360 by a user. In some embodiments, the user interface may be provided on a tactile screen of the remote control device. For instance, in a non-limiting example, the remote control device may consist in or include the remote control device 184 shown in FIGS. 7 and 8, with the remote control device 184 configured to wirelessly control operation of the at least one light source 360, and further comprising a virtual user interface 186 displayed at and operable via a tactile screen 185 of the remote control device 184. The user interface may include one or more user-operable controls configured to cause the safety device 300 to selectively extend or retract.

Figure 11:
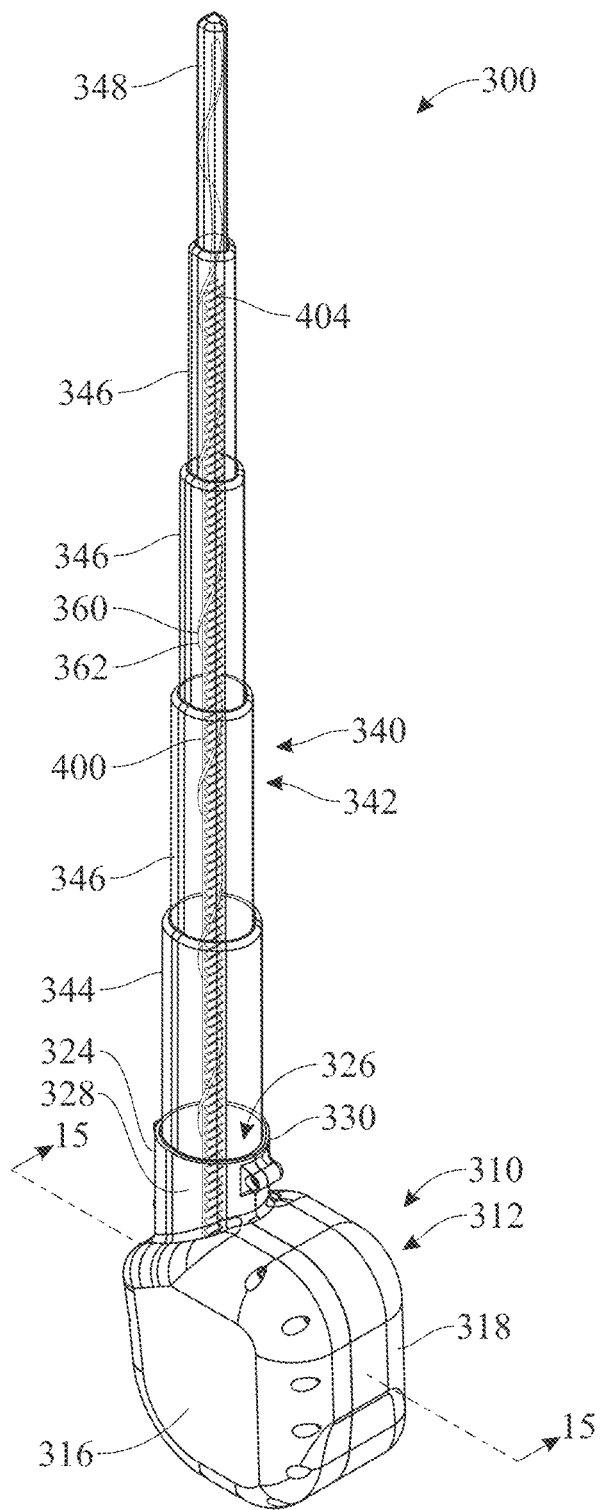
FIG. 11 presents a top, front, left side isometric view of a vehicle visibility and safety device in accordance with yet another illustrative embodiment of the present invention, the device shown in a deployed or extended configuration.

With continued reference to FIG. 11, the mount base 310 may include a hollow receptacle or housing 312 defining an interior space 314. In some embodiments, such as the present embodiment, the housing 312 may be generally square or rectangular, and optionally provided with rounded edges. However, alternative shapes are contemplated without departing from the scope of the present disclosure.

Figure 12:
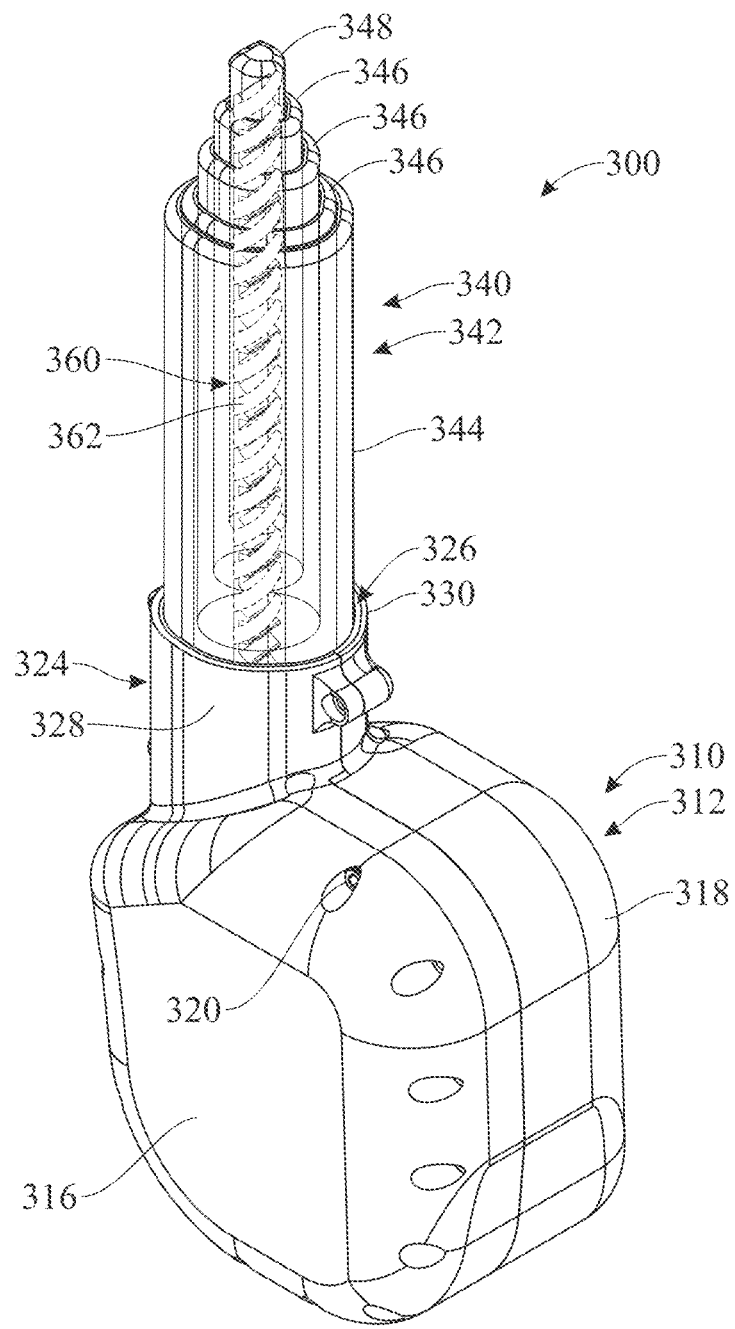
FIG. 12 presents a top, front, left side isometric view of the vehicle visibility and safety device of FIG. 11, shown in an alternative, collapsed or retracted configuration.
Figure 13:
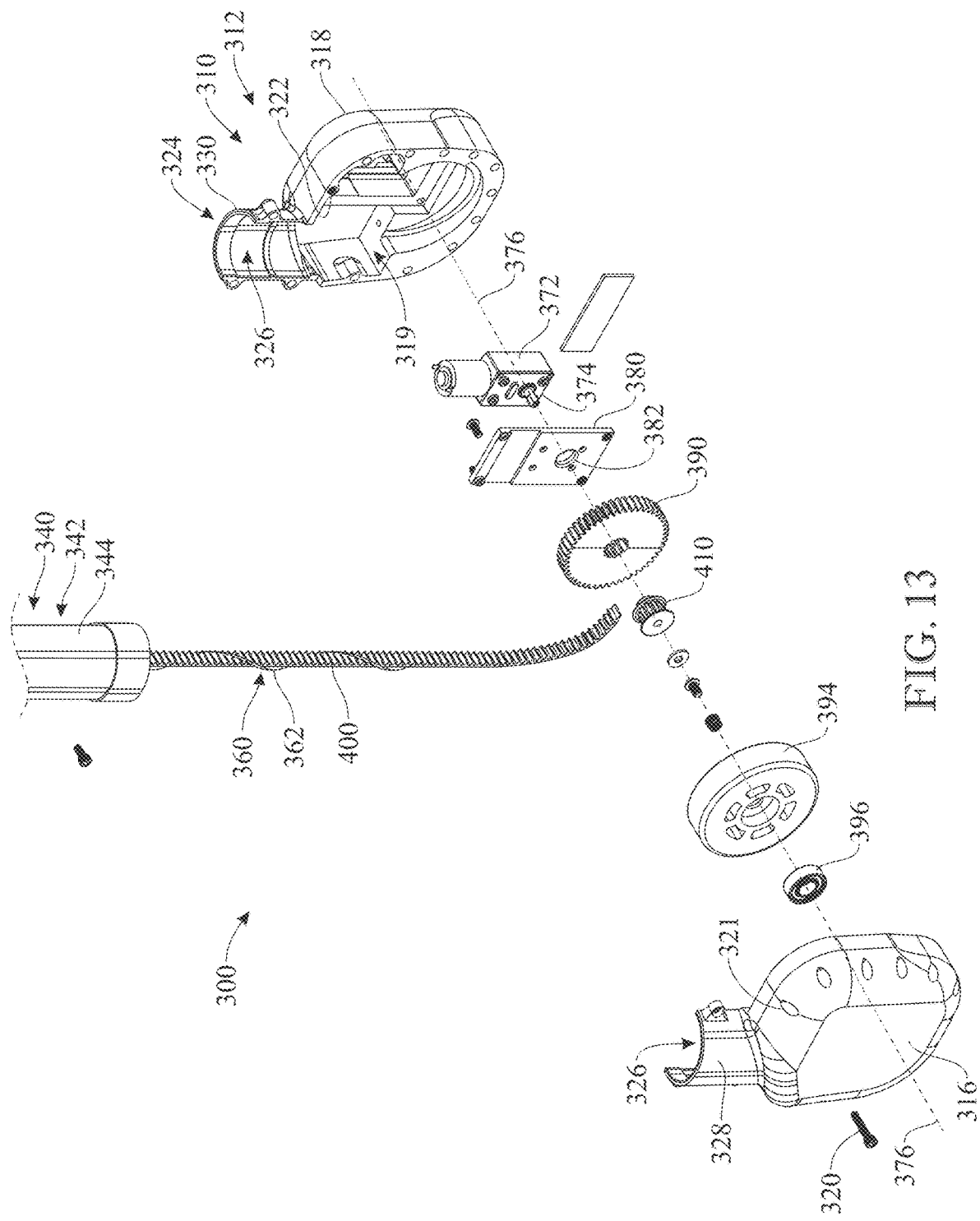
FIG. 13 presents an exploded top, front, right side isometric view of the vehicle visibility and safety device of FIG. 11.
Figure 14:
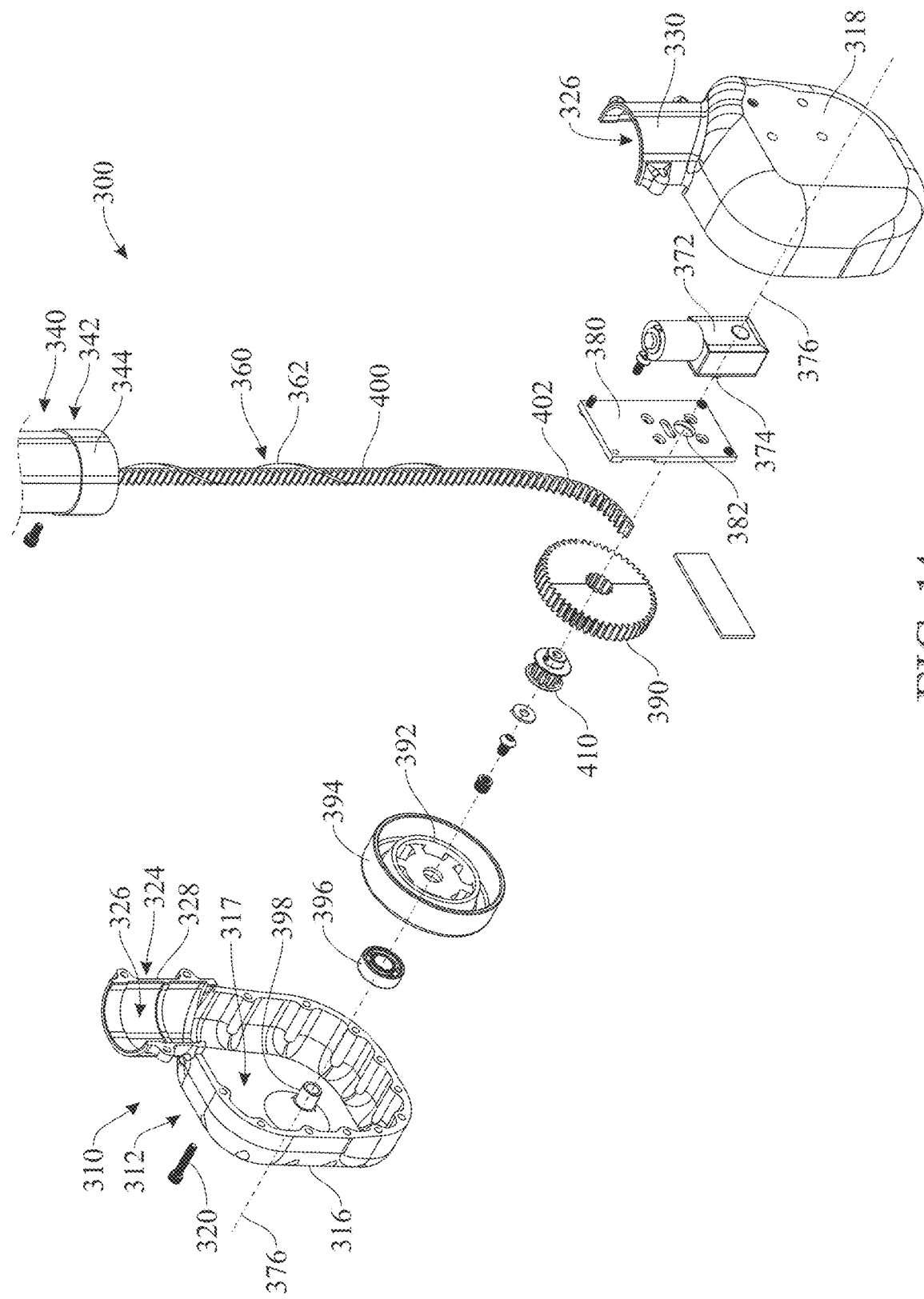
FIG. 14 presents an exploded top, front, left side isometric view of the vehicle visibility and safety device of FIG. 11.
Figure 15:
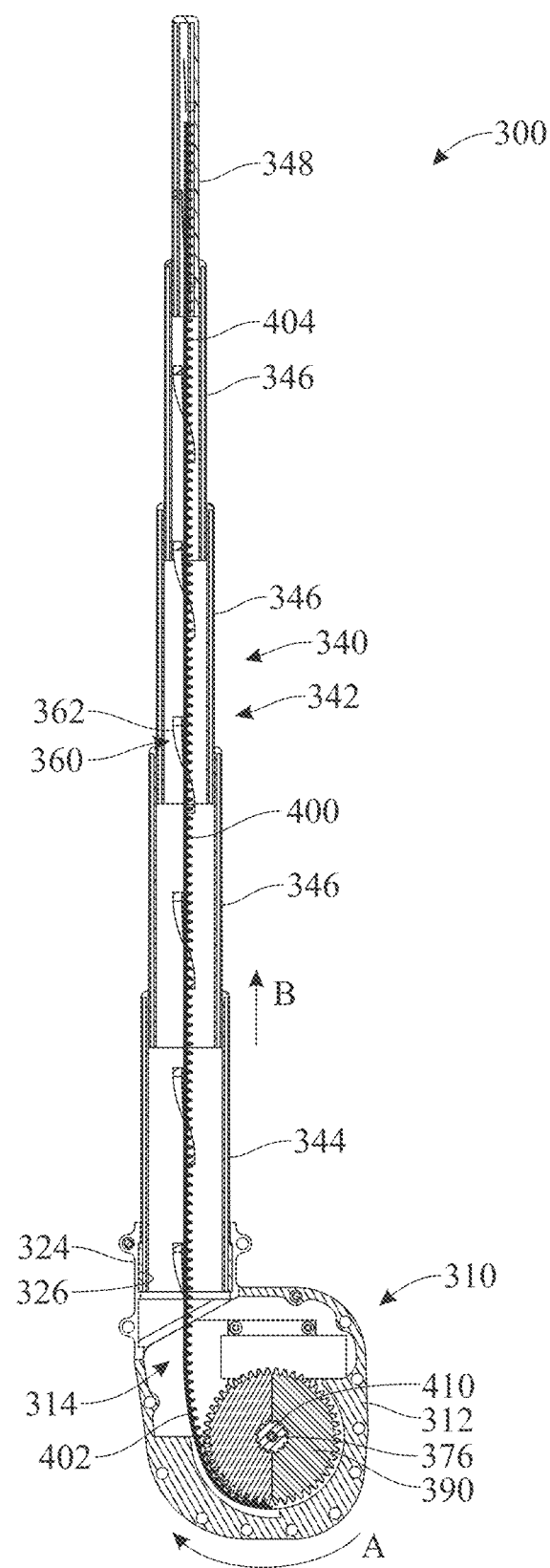
FIG. 15 presents a cross-sectional, left side elevation view of the vehicle visibility and safety device of FIG. 11, the cross-section taken along section plane 15-15.

In some embodiments, the housing 312 may be formed by two or more housing portions, which may attach to one another to form a three-dimensional, hollow structure defining the interior space 314. For instance, as shown in FIGS. 13 and 14, the housing 312 of the present embodiment specifically comprises a first housing portion 316 and a second housing portion 318, which may be preferably disconnectably attached to one another to define the interior space 314. In some embodiments, the first and second housing portions 316 and 318 may include respective cavities 317 and 319, which jointly form the interior space 314 when the first and second housing portions 316 and 318 are attached to one another. The first and second housing portions 316 and 318 may be secured to one another by at least one fastener 320 (e.g., a threaded bolt); each fastener 320 may extend through a respective fastener opening 321 formed in one of the first and second housing portions (e.g., the first housing portion 316) and thread into a threaded opening 322 formed in the other of the first and second housing portions (e.g., the second housing portion 318) to attach the first and second housing portions 316 and 318 to one another. The illustrations of FIGS. 11, 12 and 15 show the housing 312 in an assembled configuration, in which the first and second housing portions 316 and 318 are attached to one another, and define and enclose the interior space 314.

With reference to FIG. 11, the housing 312 may include a collar 324. The collar 324 defines a through opening 326 which is arranged in spatial communication with the interior space 314 of the housing 312. In some embodiments, the collar 324 may be comprised of a first collar portion 328 and a second collar portion 330. The first collar portion 328 may be attached to or, more preferably, integrally-formed with the first housing portion 316, and the second collar portion 330 may be attached to or, more preferably, integrally-formed with the second housing portion 318, as best shown in FIGS. 12 and 13. In some embodiments, the first and second housing portions 316 and 318 may be further secured to one another at the first and second collar portions 328 and 330; for instance, the second collar portion 330 of the present embodiment includes additional threaded openings 322 for attachment of respective connecting fasteners (not shown, but otherwise similar to fastener 320), which may extend through fastener openings 321 formed in the first collar portion 328.

With continued reference to FIG. 11, similarly to the embodiment of FIGS. 9A-10B, the light support 340 of the present embodiment is extendable from and retractable towards the mount base 310 jointly with the at least one light source 360. More preferably, similarly to the embodiment of FIGS. 10A-10B, the light support 340 includes a telescopically extendable and retractable tube, hereinafter referred to as telescoping tube 342, formed by a plurality of tubular sections 344, 346, 348 arranged in telescoping relationship with one another and configured to extend and retract between an extended configuration (FIGS. 11 and 15) and a collapsed or retracted configuration (FIG. 12). In a non-limiting example, the plurality of tubular sections may be made of polycarbonate (PC). The plurality of tubular sections may include a proximal tubular section 344 and a distal tubular section 348; in some embodiments, the plurality of tubular sections may further include one or more intermediate tubular sections 346 arranged between the proximal tubular section 344 and the distal tubular section 348. As shown for instance in FIGS. 11 and 12, the proximal tubular section 344 may be attached to and extend from the mount base 310; more specifically, the proximal tubular section 344 is fitted into the collar 324 and extends outward from the collar 324. The proximal tubular section 344 may be secured in place such as by a friction fitting, adhesive, fastener, and/or other attachment between the proximal section 344 and the collar 324.

The light support 340 is configured to enable light to pass through, for purposes described hereinafter. For instance, in some embodiments, at least part of the light support 340 is translucent or transparent. In a non-limiting example of an at least partially translucent or transparent light support 340, one or more, and more preferably, all of the tubular sections 344, 346 and 348 are transparent or translucent in their entirety, enabling a 360-degree or omnidirectional light emission about a central longitudinal axis of the telescoping tube 342, as will be described in greater detail hereinafter.

With reference to FIGS. 11 and 15, the at least one light source 360 may extend along the light support 340. For instance, similarly to the embodiment of FIGS. 10A-10B, the at least one light source 360 may be provided along each tubular section 344, 346, 348 of the telescoping tube 342 which forms the collapsible light support 340. In preferred embodiments, such as the present embodiment, the at least one light source 360 is contained within the light support 340, and more specifically, extends through and along the telescoping tube 342 which forms the light support 340.

As shown in FIGS. 11 and 12, the at least one light source 360 is extendable from and retractable towards the mount base 310 jointly with the telescoping tube 342 which forms the light support 340, for purposes described hereinafter. For example, the illustration of FIG. 11 shows the at least one light source 360 and light support 340 jointly arranged in the extended configuration, while the illustration of FIG. 12 shows the at least one light source 360 and light support 340 jointly arranged in the collapsed or retracted configuration.

Referring now to FIGS. 13 and 14, the safety device 300 may further include an electrically-operated actuating mechanism 370 configured to selectively extend and retract the at least one light source 360 from and towards the mount base 310, respectively. The electrically-operated actuating mechanism 370 may be housed within the interior space 314 of the housing 312 of the mount base 310. In preferred embodiments, the electrically-operated actuating mechanism 370 may be concealed by the housing 312 and not visible from outside the housing 312.

As shown, the electrically-operated actuating mechanism 370 may include an electric motor 372. In a non-limiting example, the electric motor 372 may be a 12 VDC 10 rpm motor. In some embodiments, the electric motor 372 may be electrically powered by an electrical power source of the vehicle, such as, but not limited to, a vehicle battery (e.g., a 12 VDC battery). The electric motor 372 may be selectively activated to rotate a motor shaft 374 in a first or winding direction and an opposite, second or unwinding direction about a rotation axis 376. The electric motor 372 may be mounted within the cavity 319 of the second housing portion 318. In some embodiments, a motor-retaining lid 380 may retain the electric motor 372 in place with respect to the second housing portion 318. For instance, the electric motor 372 may be attached to and carried by the motor-retaining lid 380, which in turn may be secured to the second housing portion 318. The motor shaft 374 main extend through or be otherwise accessible through an opening 382 formed in the motor-retaining lid 380.

The electrically-operated actuating mechanism 370 may further include a round gear or pinion 390, which is driven for rotation by the electric motor 372 via the motor shaft 374. In a non-limiting example, the pinion 390 may include a split gear, which may be made of plastic. In some embodiments, such as the present embodiment, the pinion 390 may be mounted adjacent to a gear rack spool 392. The gear rack spool 392 may be affixed to or otherwise arranged within a spool housing 394. In some embodiments, such as the present embodiment, the gear rack spool 392 and the spool housing 394 may be integrally-formed into a single-piece unit. A flexible gear rack 400 may operatively interface with the pinion 390; more specifically, the pinion 390 meshes with the flexible gear rack 400 such that a rotational energy of the pinion 390 may be converted into a longitudinal displacement energy at the flexible gear rack 400.

The preferably integrally-formed, or otherwise affixed, gear rack spool 392 and spool housing 394 may be rotatably carried by the first housing portion 316. For instance, a bearing 396 may be mounted between a projection 398 of the first housing portion 316, on one hand, and the gear rack spool 392 and spool housing 394, on the other hand, enabling a joint rotation of the gear rack spool 392 and the spool housing 394 (as well as the pinion 390 associated therewith) with respect to the first housing portion 316 about the rotation axis 376.

In some embodiments, the electrically-operated actuating mechanism 370 may further include a pulley 410. The pinion 390 may be non-rotationally attached to the pulley 410, such that the pinion 390 and pulley 410 are jointly rotatable about the rotation axis 376. In turn, the pulley 410 may be non-rotationally attached to the motor shaft 374, such that the pulley 410 and the motor shaft 374 are jointly rotatable about the rotation axis 376. Thus, the pinion 390 may be driven for rotation by the motor shaft 374 via the pulley 410. In a non-limiting example, the pulley 410 may be made of metal, providing a robust connection between the motor shaft 374 and the pulley 410, particularly in embodiments in which the pulley 410 is made of plastic.

As mentioned heretofore, the flexible gear rack 400 may be selectively extendable and retractable by the pinion 390 responsively to rotation of the pinion 390. In extending or retracting, the flexible gear rack 400 may push or pull on the at least one light source 360 (e.g., LED strip) to respectively extend or retract the at least one light source 360 with respect to the mount base 310. I.e., the at least one light source 360 (e.g., LED strip) is extendable from and retractable towards the mount base 310 by a force exerted thereon by the flexible gear rack 400 when the flexible gear rack extends and retracts, respectively.

In preferred embodiments, as shown, the at least one light source 360 is affixed to the flexible gear rack 400 and extends along the flexible gear rack 400, such as in a coiled arrangement over and along the flexible gear rack 400. The force exerted by the flexible gear rack 400 on the at least one light source 360 may be specifically exerted by a distal end 404 of the flexible gear rack 400, the distal end 404 located opposite to a proximal end 402 of the flexible gear rack 400 which extends from the pinion 390.

In some embodiments, the flexible gear rack 400 may alternatively or additionally exert a pulling/pushing force directly on the telescoping tube 342 in order to expand/retract the telescoping tube 342 as heretofore described. For instance, the distal end 404 of the flexible gear rack 400 may be connected to the distal tubular section 348 of the telescoping tube 342 and exert a pulling/pushing force thereon to retract/extend the telescoping tube 342.

Similarly to previous embodiments, the device may include a microcontroller or other processor, and/or a manual switch. The microcontroller may be provided on a printed circuit board (PCB) 420, which may be mounted to the motor-retaining lid 380 and housed in the second housing portion 318 together with the electric motor 372 and motor-retaining lid 380. In some embodiments, the safety device 300 may include a battery; alternatively or additionally, the device may be powered by a power source of the vehicle, as heretofore described. In some applications, the microcontroller or the at least one light source 360 may be hardwired into the vehicle 204 such that the at least one light source 360 is energized when the vehicle 204 is on. In other applications, the microcontroller or the at least one light source 360 may be controlled by a manual switch, which may be provided on the mount base 310 or elsewhere on the safety device 300.

In an illustrative application, the safety device 300 may be mounted on a vehicle, hereinafter referred to as vehicle 204 (FIGS. 1A, 1B, and 9A-10B) to enhance visibility of the vehicle 204 for safety purposes. The safety device 300 may then be powered on. For instance and without limitation, the safety device 300 may be automatically powered by an internal battery of the safety device 300, or by a power source of the vehicle 204 (e.g., a vehicle battery). In some embodiments, the user (e.g., vehicle operator 216 of FIG. 1A) may operate the switch of the safety device 300 in order to allow electrical power to be supplied to the safety device 300. Next, the user may operate one or more controls in the user interface of the remote control device to selectively extend or retract the light support 340, and more specifically, the telescoping tube 342 of the light support 340.

For example, user operation of the remote control device to extend the light support 340 causes the remote control device to wirelessly transmit an expansion command to the safety device 300, such as to the microcontroller of the safety device 300. Responsively, the microcontroller activates the electric motor 372 for rotation of the motor shaft 374 in the unwinding direction about the rotation axis 376; the unwinding direction is indicated with arrow A in FIG. 15. Via the pulley 410, rotation of the motor shaft 374 is transmitted to the pinion 390. Rotation of the pinion 390 in the unwinding direction A causes the meshed, flexible gear rack 400 to displace longitudinally upward as indicated by arrow B. As the flexible gear rack 400 displaces upward, the flexible gear rack 400 unwinds from the gear rack spool 392 and the distal end 404 of the flexible gear rack 400 pulls upward on the distal tubular section 348 causing the telescoping tube 342 to expand in the direction of arrow B, as the at least one light source 360 expands jointly with the flexible gear rack 400 and the telescoping tube 342. After a sufficient operation of the electric motor 372, the safety device 300 eventually reaches a fully extended position, shown in FIGS. 11 and 15. Alternatively, the electric motor 372 may be operated to a lesser degree, causing the safety device 300 to become only partially extended.

Once the safety device 300 has been extended to the desired length, the user may operate the user interface to switch the at least one light source 360 on. For example, the user may operate the appropriate or "Turn On" power selector 188 shown in FIG. 7. Responsively to operation of the user interface, the remote control device may wirelessly transmit a power-on signal or command to the microcontroller, and the microcontroller may responsively activate the at least one light source 360. When the at least one light source 360 is illuminated, a light pattern is elongately formed along a selected direction (the direction of arrow B). In the present embodiment, in which the at least one light source 360 is formed as an LED strip which extends along (e.g., is wrapped around) the flexible gear rack 400, the selected direction matches the longitudinal direction of the flexible gear rack 400 (arrow B). In this way, a light pattern may be provided along the flexible gear rack 400, and may thus extend along virtually the entire length of the light support 340. In embodiments in which all of the tubular sections 344, 346 and 348 of the telescoping tube 342 which forms the light support 340 are transparent or translucent in their entirety, the light pattern may be formed in a 360-degree or omnidirectional manner about a central longitudinal axis of the telescoping tube 342.

When desired, the user may operate the user interface to switch the at least one light source 360 off. For example, the user may operate the appropriate or "Turn Off" power selector 188 shown in FIG. 7. Responsively to operation of the user interface, the remote control device may wirelessly transmit a power-off signal or command to the microcontroller, and the microcontroller may responsively deactivate the at least one light source 360.

Alternatively, the user may operate the remote control device to collapse or retract the light support 340. User operation of the remote control device to collapse the light support 340 causes the remote control device to wirelessly transmit a retraction command to the safety device 300, such as to the microcontroller of the safety device 300. Responsively, the microcontroller activates the electric motor 372 for rotation of the motor shaft 374 in the winding direction about the rotation axis 376, the winding direction being a direction opposite to arrow A (FIG. 15). Via the pulley 410, rotation of the motor shaft 374 is transmitted to the pinion 390. Rotation of the pinion 390 in the winding direction (opposite to arrow A) causes the meshed, flexible gear rack 400 to displace longitudinally downward (oppositely to the direction of arrow B). As the flexible gear rack 400 displaces downward, the flexible gear rack 400 winds onto the gear rack spool 392 and the distal end 404 of the flexible gear rack 400 pulls downward on the distal tubular section 348 causing the telescoping tube 342 to collapse in a direction opposite to arrow B, as the at least one light source 360 collapses jointly with the flexible gear rack 400 and the telescoping tube 342. After a sufficient operation of the electric motor 372, the safety device 300 may reach a fully collapsed position, shown in FIG. 12. Alternatively, the electric motor 372 may be operated to a lesser degree, causing the safety device 300 to become only partially collapsed. Once the safety device 300 has been partially or fully collapsed, the user may operate the user interface to switch the at least one light source 360 on/off as was heretofore described.

In this way, the safety device 300 of the present embodiment, similarly to prior embodiments (e.g., safety device 236 of FIGS. 10A-10B) may emit a length-adjustable, elongated light pattern, which may render the vehicle 204 more visible and enhance the safety of the vehicle operator 216. As the vehicle operator 216 operates the vehicle 204 on a road or street, particularly in a dark or semi-dark environment, the elongated light pattern attracts the attention of the drivers of other vehicles on the road or street, rendering the vehicle 204 more visible.

The at least one light source 360 of the safety device 300 is selectively extendable from and retractable towards the mount base 310 to vary the length of the elongated light pattern (i.e. to vary the dimension of the elongated light pattern along the selected direction or arrow B). As with previous embodiments, the light pattern may be emitted in a column extending in a selected direction with respect to the vehicle. An outside observer will easily appreciate the elongated light pattern or column, which preferably extends around a full 360-degree periphery of the light support 340, as heretofore described. Various characteristics such as the light intensity and light color may be selected by manipulation of the respective light intensity control 192 and light color control 194 on the user interface 186, as was heretofore described with respect to FIG. 8. The light pattern width may be adjustable, for instance, by varying the light intensity.

When the safety device 300 is not in use, the safety device 300 may be maintained in the deployed or expanded configuration (FIG. 11), in a partially expanded (partially collapsed) configuration, or in the fully collapsed or retracted configuration (FIG. 12).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A vehicle visibility and safety device for attachment to a vehicle to enhance visibility of the vehicle, the device comprising:
   a mount base configured for attachment to the vehicle;
   a light support carried by the mount base;
   at least one light source positioned at the light support, the at least one light source configured to illuminate and thereby form at least one light pattern, the at least one light pattern elongately formed along a selected direction and extending from the vehicle along the selected direction, wherein the at least one light source is selectively extendable from and retractable towards the mount base to vary a length of the at least one elongated light pattern along the selected direction; and
   a remote control device configured to facilitate user operation of the at least one light source; wherein
   the light support is length-adjustable along the selected direction; wherein
   the vehicle visibility and safety device further comprises an electrically-operated actuating mechanism configured to selectively extend and retract the at least one light source from and towards the mount base, wherein the electrically-operated actuating mechanism comprises an electric motor configured to drive the at least one light source to selectively expand and retract.

2. The vehicle visibility and safety device of claim 1, wherein the light support comprises a telescopically extendable and retractable tube formed by a plurality of tubular sections arranged in telescoping relationship with one another along the selected direction.

3. The vehicle visibility and safety device of claim 2, wherein a proximal tubular section of the plurality of tubular sections is attached to and extends from the mount base.

4. The vehicle visibility and safety device of claim 3, wherein the remaining tubular sections of the plurality of tubular sections are configured to retract into the proximal tubular section of the plurality of tubular sections when reducing said length of the at least one elongated light pattern.

5. The vehicle visibility and safety device of claim 1, wherein the at least one light source is contained within the light support.

6. The vehicle visibility and safety device of claim 5, wherein at least part of the light support is translucent, and the at least one light source extends along said at least part of the light support.

7. The vehicle visibility and safety device of claim 6, wherein said at least part of the light support is translucent along a full periphery of said at least part of the light support about a central longitudinal axis of said at least part of the light support, the central axis arranged in the selected direction, such that said at least one light pattern is projected 360 degrees about the light support.

8. The vehicle visibility and safety device of claim 7, wherein said at least part of the light support is the light support in its entirety.

9. The vehicle visibility and safety device of claim 7, wherein said at least part of the light support is telescopically length-adjustable along the selected direction.

10. The vehicle visibility and safety device of claim 1, wherein the light support is extendable from and retractable towards the mount base jointly with the at least one light source.

11. The vehicle visibility and safety device of claim 1, wherein the mount base comprises a housing defining an interior space, and further wherein the electrically-operated actuating mechanism is housed within the interior space.

12. The vehicle visibility and safety device of claim 1, wherein the electrically-operated actuating mechanism is configured to selectively increase or reduce a length of the light support along the selected direction simultaneously to extending or retracting the at least one light source from and towards the mount base, respectively.

13. The vehicle visibility and safety device of claim 1, wherein the remote control device is configured to wirelessly control operation of the at least one light source.

14. The vehicle visibility and safety device of claim 1, wherein the remote control device comprises a user interface enabling remote operation of the at least one light source by a user.

15. The vehicle visibility and safety device of claim 14, wherein the user interface is provided on a tactile screen of the remote control device.

16. The vehicle visibility and safety device of claim 1, wherein the electric motor is further configured to drive the light support to selectively expand and retract along the selected direction jointly with the at least one light source.

17. A vehicle visibility and safety device for attachment to a vehicle to enhance visibility of the vehicle, the device comprising:
   a mount base configured for attachment to the vehicle;
   a light support carried by the mount base;
   at least one light source positioned at the light support, the at least one light source configured to illuminate and thereby form at least one light pattern, the at least one light pattern elongately formed along a selected direction and extending from the vehicle along the selected direction, wherein the at least one light source is selectively extendable from and retractable towards the mount base to vary a length of the at least one elongated light pattern along the selected direction; and
   a remote control device configured to facilitate user operation of the at least one light source, the remote control device comprising a user interface enabling remote operation of the at least one light source by a user, wherein the user interface is provided on a tactile screen of the remote control device; wherein
   the light support is length-adjustable along the selected direction.

* * * * *